(12) United States Patent
Patwari et al.

(10) Patent No.: US 11,167,420 B2
(45) Date of Patent: Nov. 9, 2021

(54) SYSTEMS AND METHODS FOR AUTO-GENERATING A CONTROL AND MONITORING SOLUTION FOR SMART AND ROBOTICS ENVIRONMENTS

(71) Applicant: Tata Consultancy Services Limited, Mumbai (IN)

(72) Inventors: Puneet Patwari, Pune (IN); Subhrojyoti RC, Pune (IN); Amar Banerjee, Pune (IN); Ashwin Arun, Chennai (IN); Jayakumar VK, Chennai (IN); Thanga Jawahar Kalidoss, Chennai (IN); Jagpreet Singh Sasan, Bhubaneswar (IN); Yash Kedia, Bhubaneswar (IN)

(73) Assignee: Tata Consultancy Services Limited, Mumbai (IN)

( * ) Notice: Subject to any disclaimer, the term of this patent is extended or adjusted under 35 U.S.C. 154(b) by 329 days.

(21) Appl. No.: 16/268,314

(22) Filed: Feb. 5, 2019

(65) Prior Publication Data
US 2019/0240837 A1    Aug. 8, 2019

(30) Foreign Application Priority Data
Feb. 6, 2018   (IN) .............................. 201821004507

(51) Int. Cl.
*H04L 12/28*   (2006.01)
*G05B 19/042*   (2006.01)
(Continued)

(52) U.S. Cl.
CPC ............ *B25J 9/1694* (2013.01); *B25J 9/1653* (2013.01); *G05B 15/02* (2013.01);
(Continued)

(58) Field of Classification Search
CPC ........ G05B 13/02; G05B 15/02; G05B 17/02; G05B 2219/2642; G05B 2219/31264;
(Continued)

(56) References Cited

U.S. PATENT DOCUMENTS

| 6,947,917 | B1 | 9/2005 | Mathur et al. |
| 7,395,254 | B2 | 7/2008 | Gu et al. |

(Continued)

FOREIGN PATENT DOCUMENTS

| EP | 2260365 | 12/2010 | | |
| WO | WO-2018176025 | A1 * | 9/2018 | ....... G05B 19/41885 |
| WO | WO-2019132868 | A1 * | 7/2019 | ............ H04W 16/06 |

*Primary Examiner* — Khoi H Tran
*Assistant Examiner* — Tanner L Cullen
(74) *Attorney, Agent, or Firm* — Finnegan, Henderson, Farabow, Garrett & Dunner LLP

(57) ABSTRACT

Systems and methods for auto-generating a control and monitoring solution for smart and robotics environments. The traditional systems and methods provide solutions for the smart and robotics environments by manually generating codes but none of them provide for auto-generation of the control and monitoring solutions and the corresponding coordination logics. Embodiments of the present disclosure provide for auto-generating the control and monitoring solution by capturing a set of domain knowledge and information on capabilities of a plurality of devices by an accumulator module (201), auto-generating a controlled coordination logic based upon the set of domain knowledge and the capabilities information by a control logic synthesizer module (202) and auto-generating, by an implementation module (203), the control and monitoring solution for the smart and robotics environments based upon the coordination control logic.

9 Claims, 5 Drawing Sheets

(51) Int. Cl.
  *B25J 9/16* (2006.01)
  *G05B 15/02* (2006.01)
  *G06Q 10/04* (2012.01)
  *G06Q 10/10* (2012.01)
  *G05B 17/02* (2006.01)
  *G06F 8/30* (2018.01)
  *H04W 4/70* (2018.01)
  *H04L 29/08* (2006.01)

(52) U.S. Cl.
  CPC ......... *G05B 19/0426* (2013.01); *G06Q 10/04* (2013.01); *G06Q 10/103* (2013.01); *H04L 12/2803* (2013.01); *G05B 17/02* (2013.01); *G05B 2219/2642* (2013.01); *G05B 2219/50391* (2013.01); *G06F 8/30* (2013.01); *G06Q 10/10* (2013.01); *H04L 67/12* (2013.01); *H04W 4/70* (2018.02)

(58) Field of Classification Search
  CPC ......... G06F 8/30; B25J 9/1656; B25J 9/1671; H04L 67/12; H04L 12/2803
  See application file for complete search history.

(56) References Cited

U.S. PATENT DOCUMENTS

| | | | |
|---|---|---|---|
| 7,685,083 | B2 | 3/2010 | Fairweather |
| 10,216,540 | B2* | 2/2019 | Kuo ........................ H04L 67/26 |
| 2006/0064694 | A1* | 3/2006 | Messer .............. G06Q 10/1097 |
| | | | 718/100 |
| 2009/0282067 | A1 | 11/2009 | Bendigeri et al. |
| 2011/0154288 | A1 | 6/2011 | Kung |
| 2013/0131837 | A1* | 5/2013 | Washington ........... G05B 15/02 |
| | | | 700/12 |
| 2014/0324973 | A1* | 10/2014 | Goel ....................... H04L 67/16 |
| | | | 709/204 |
| 2018/0052451 | A1* | 2/2018 | Billi-Duran ...... G05B 19/41835 |
| 2018/0089455 | A1* | 3/2018 | Castinado ............... G06F 21/44 |
| 2018/0178379 | A1* | 6/2018 | Takeda ..................... B25J 9/1669 |
| 2018/0299873 | A1* | 10/2018 | Chauvet ................ H04L 12/46 |
| 2020/0310394 | A1* | 10/2020 | Wouhaybi ........... H04L 41/0846 |

* cited by examiner

SYSTEMS AND METHODS FOR AUTO-GENERATING A CONTROL AND MONITORING SOLUTION FOR SMART AND ROBOTICS ENVIRONMENTS

PRIORITY CLAIM

This U.S. patent application claims priority under 35 U.S.C. § 119 to: India Application No. 201821004507, filed on Feb. 6, 2018. The entire contents of the aforementioned application are incorporated herein by reference.

TECHNICAL FIELD

The present disclosure generally relates to auto-generation of a control and monitoring solution for smart and robotics environments. More particularly, the present disclosure relates to systems and methods for auto-generating a control and monitoring solution for smart and robotics environments.

BACKGROUND

Smart and robotics based technologies are changing in the day-to-day lives of human beings. People interact with a number of different electronic devices on a daily basis. In a home setting, for example, a person may interact with smart thermostats, lighting systems, alarm systems, entertainment systems, and a variety of other electronic devices. To interact with some of these electronic devices, a person may communicate a command using an application program running on another electronic device. For instance, a person may control the temperature setting on a smart thermostat using an application program running on a smartphone. The application program may communicate with a secure online service that interacts with that thermostat.

Building and developing intelligent or smart environments based on the emergence of technologies such as Internet of Things (IoT) or robotics has gained a big momentum in computing world. Smart environment based technologies offer multiple solutions for executing a plurality of processes and activities in the smart environments. However, software solutions for such smart environments such as a meeting room comprising of smart or robotics devices are developed from scratch by a developer each time they are required to build solutions as part of a customer specific engagement.

Another problem with traditional systems and methods is a usage of centralized control, typically employing a central controller in a network, executing a program code that is customized for specialized user-defined control tasks. As a result, the traditional systems and methods are typically constrained to a particular size and difficult to adapt over time to arising needs. Similarly, the traditional systems and methods may be inflexible in configuration, often requiring a complete software revision for the entire system when new devices are incorporated. Furthermore, the traditional systems and methods tend to be expensive and usually perform on the functions initially identified by a user or a system designer that are only altered or reprogrammed to perform new functions by an expert who is familiar with the entire control system configuration and programming. Moreover, to obtain such interaction or interoperability among multiple devices operating in smart environments, especially devices from different manufacturers, complex standards and protocols are adopted by the traditional systems and methods. The limitations of the traditional systems and methods in supervisory status surveillance, and in controlling human/machine interfaces hamper effective recognition and response to emergent conditions that may require human intervention and/or automatic remediation. None of the traditional systems and methods provide for a generic mechanism which can automate the creation of control and monitoring solutions to automate multiple tasks executing in the smart environments.

SUMMARY

Embodiments of the present disclosure present technological improvements as solutions to one or more of the above-mentioned technical problems recognized by the inventors in conventional systems. For example, in one embodiment, a method for auto-generating a control and monitoring solution for smart and robotics environments is provided, the method comprising: performing, a plurality of steps, wherein the plurality of steps comprises: (i) capturing, by an accumulator module, a first set of information corresponding to one or more processes, wherein the first set of information comprises a set of domain knowledge corresponding to the one or more processes, and wherein the one or more processes correspond to a plurality of monitoring and control activities executing in the smart and robotics environments; and (ii) capturing, by the accumulator module, a second set of information on a plurality of devices integrated into the smart and robotics environments, wherein the second set of information comprises data on execution capabilities corresponding to the plurality of devices; auto-generating, based upon the first set of information and the second set of information, a coordination control logic, by a control logic synthesizer module, wherein the coordination control logic comprises a coordination logic design for implementing a coordination logic between the plurality of devices; auto-generating, by an implementation module, the control and monitoring solution corresponding to the smart and robotics environments, based upon the coordination control logic; auto-generating the coordination control logic by auto-generating, based upon the first set of information and the second set of information, a first set of codes, by the control logic synthesizer module, for implementing the coordination logic between the plurality of devices; auto-generating the control and monitoring solution by auto-generating, based upon the coordination control logic, a second set of codes to translate the coordination control logic into the control and monitoring solution; defining one or more execution logics of the plurality of devices by a hierarchy of the plurality of control and monitoring activities and the coordination control logic; and mapping the plurality of control and monitoring activities with the plurality of devices, wherein the mapping is performed based upon the auto-generated coordination control logic.

In another aspect, there is provided a system for auto-generating a control and monitoring solution for smart and robotics environments, the system comprising a memory storing instructions; one or more communication interfaces; and one or more hardware processors coupled to the memory via the one or more communication interfaces, wherein the one or more hardware processors are configured by the instructions to: perform, a plurality of steps, wherein the plurality of steps comprises: (i) capture, by an accumulator module, a first set of information corresponding to one or more processes, wherein the first set of information comprises a set of domain knowledge corresponding to the one or more processes, and wherein the one or more processes correspond to a plurality of monitoring and control activities executing in the smart and robotics environments; and (ii) capture, by the accumulator module, a second set of information on a plurality of devices integrated into the smart and robotics environments, wherein the second set of information comprises data on execution capabilities corresponding to the plurality of devices; auto-generate, based upon the first set of information and the second set of information, a coordination control logic, by a control logic synthesizer module, wherein the coordination control logic comprises a coordination logic design for implementing a coordination logic between the plurality of devices; auto-generate, by an implementation module, the control and monitoring solution corresponding to the smart and robotics environments, based upon the coordination control logic; auto-generate the coordination control logic by auto-generating, based upon the first set of information and the second set of information, a first set of codes, by the control logic synthesizer module, for implementing the coordination logic between the plurality of devices; auto-generate the control and monitoring solution by auto-generating, based upon the coordination control logic, a second set of codes to translate the coordination control logic into the control and monitoring solution; define one or more execution logics of the plurality of devices by a hierarchy of the plurality of control and monitoring activities and the coordination control logic; and map the plurality of control and monitoring activities with the plurality of devices, wherein the mapping is performed based upon the auto-generated coordination control logic.

In yet another aspect, there is provided one or more non-transitory machine readable information storage mediums comprising one or more instructions which when executed by one or more hardware processors causes the one or more hardware processor to perform a method for auto-generating a control and monitoring solution for smart and robotics environments, the method comprising: (i) capturing, by an accumulator module, a first set of information corresponding to one or more processes, wherein the first set of information comprises a set of domain knowledge corresponding to the one or more processes, and wherein the one or more processes correspond to a plurality of monitoring and control activities executing in the smart and robotics environments; and (ii) capturing, by the accumulator module, a second set of information on a plurality of devices integrated into the smart and robotics environments, wherein the second set of information comprises data on execution capabilities corresponding to the plurality of devices; auto-generating, based upon the first set of information and the second set of information, a coordination control logic, by a control logic synthesizer module, wherein the coordination control logic comprises a coordination logic design for implementing a coordination logic between the plurality of devices; auto-generating, by an implementation module, the control and monitoring solution corresponding to the smart and robotics environments, based upon the coordination control logic; auto-generating the coordination control logic by auto-generating, based upon the first set of information and the second set of information, a first set of codes, by the control logic synthesizer module, for implementing the coordination logic between the plurality of devices; auto-generating the control and monitoring solution by auto-generating, based upon the coordination control logic, a second set of codes to translate the coordination control logic into the control and monitoring solution; defining one or more execution logics of the plurality of devices by a hierarchy of the plurality of control and monitoring activities and the coordination control logic; and mapping the plurality of control and monitoring activities with the plurality of devices, wherein the mapping is performed based upon the auto-generated coordination control logic.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
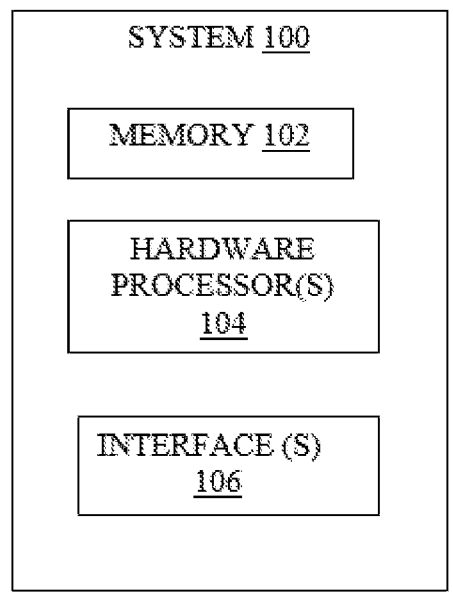
FIG. 1 illustrates a block diagram of a system for auto-generating a control and monitoring solution for smart and robotics environments, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

The embodiments of the present disclosure provides systems and methods for auto-generating a control and monitoring solution for smart and robotics environments. Intelligent or smart environments based on the emergence of using technologies such as Internet of Things (IoT) or robotics are increasingly touching upon day-to-day lives. However, technical solutions for such smart environments such as meeting rooms comprising of IoT and robotics based devices are to be developed or coded every time a need arises. The capabilities of the implemented smart environment of a specific nature such as a meeting room can be observed to have a lot of commonality across multiple deployments. This is because the smart solutions may be thought of as an instantiation of a generic process that is common across smart environments of similar nature such as a meeting room comprising of the IoT and robotics based devices.

The traditional systems and methods tend to be expensive and are usually executed or implemented based on the functions initially identified by a user, and that may only be altered or reprogrammed to perform new functions by an expert who is familiar with the entire control system configuration and programming. Hence, each time a new solution is required to be generated for the smart and robotics environment needs, the user is required to capture manually all information pertaining to the processes, devices integrated in the smart and robotics environments, execution capabilities of the devices etc. and then generate the solution as per the requirements. Moreover, to obtain interaction among multiple IoT and robotics based devices operating in the smart and robotics environments, complex standards and protocols are adopted and programming logics are to be written.

Hence, there is a need for a technology which provides for capturing the process of execution of various tasks for different smart and robotics environments as a standard domain knowledge, capturing information or knowledge about various devices integrated in the smart and robotics environments, extract logic for controlling the devices and execution of various processes, generating a control solution corresponding to the smart and robotics environments and finally, enabling the controlled solution to cater to dynamically changing context.

Referring now to the drawings, and more particularly to FIGS. 1 through 5, where similar reference characters denote corresponding features consistently throughout the figures, there are shown preferred embodiments and these embodiments are described in the context of the following exemplary system and/or method.

FIG. 1 illustrates an exemplary block diagram of a system 100 for auto-generating a control and monitoring solution for smart and robotics environments according to an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

Figure 2:
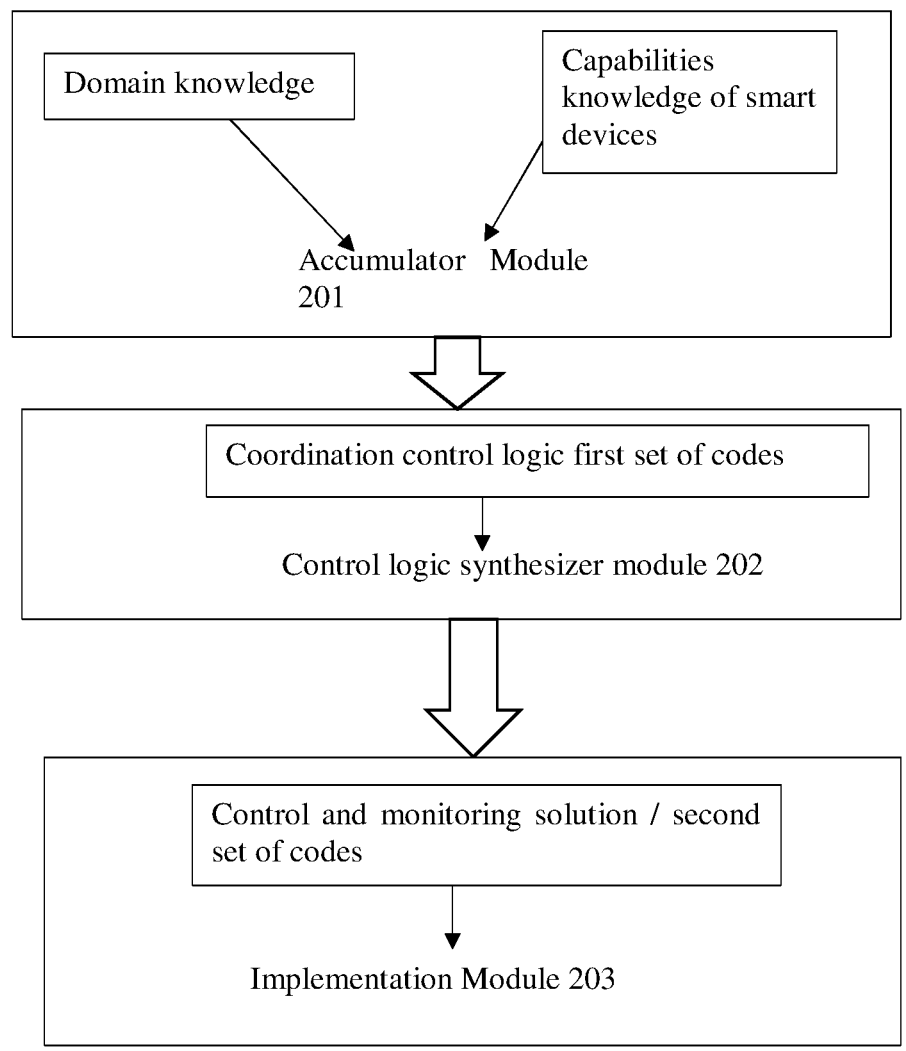
FIG. 2 is an architecture depicting the components and flow of a system for auto-generating the control and monitoring solution the smart and robotics environments, according to some embodiments of the present disclosure.

According to an embodiment of the present disclosure, referring to FIG. 2, the architecture and components of the system 100 for auto-generating the control and monitoring solution for the smart and robotics environments may be considered in detail. An accumulator module 201 captures information pertaining to domain knowledge of processes to be executed and capabilities of multiple devices integrated into the smart and robotics environment. A Control logic synthesizer module 202 facilitates auto-generation of coordination logic required for coordination of the multiple devices. The Control logic synthesizer module 202 further facilitates the auto-generation of coordination logic in the form of codes as well. An implementation module 203 facilitates auto-generation of the control and monitoring solution for the smart and robotics environments. The implementation module 203 also facilitates auto-generation of the control and monitoring solution in the form of codes.

Figure 3:
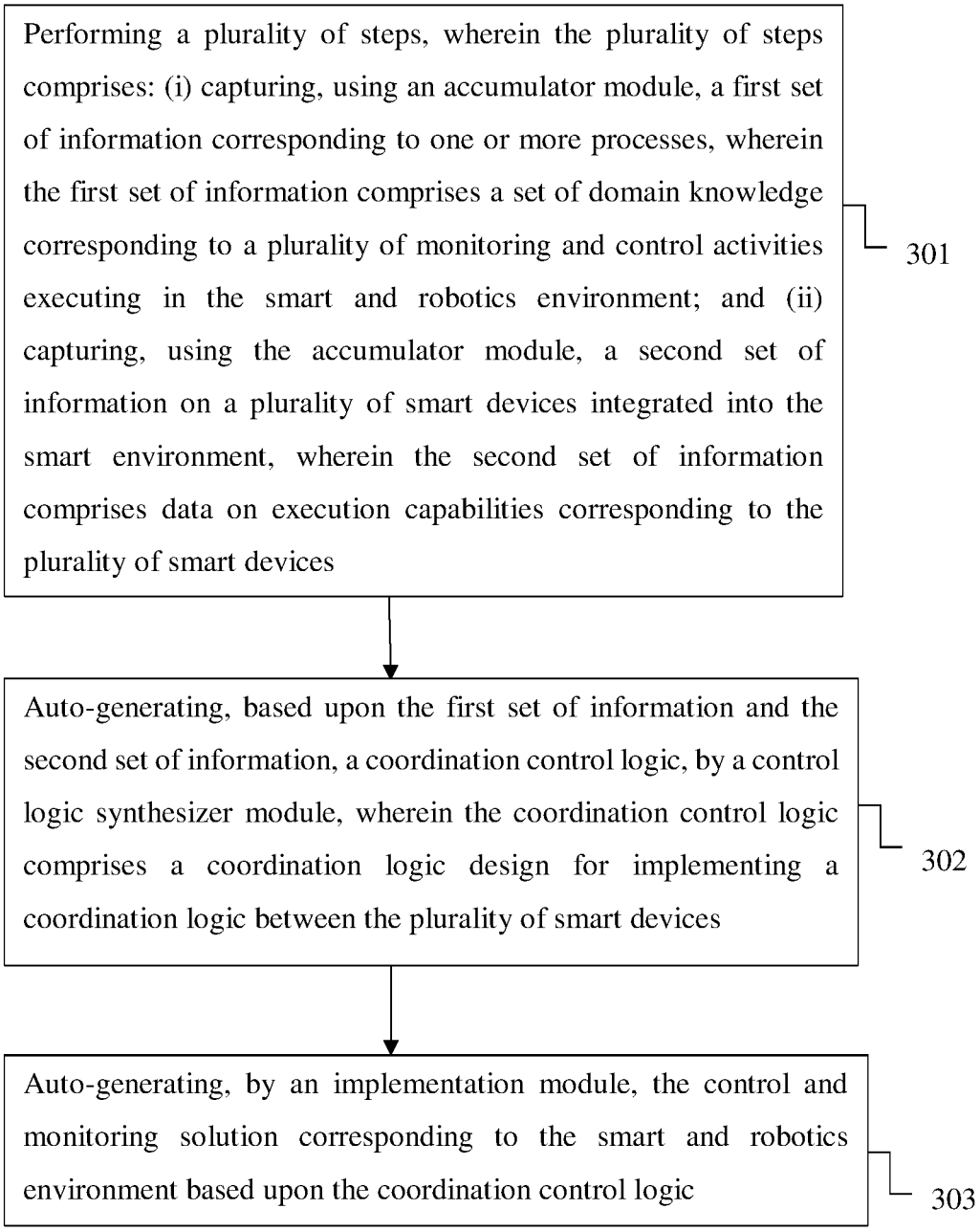
FIG. 3 is a flow diagram illustrating the steps involved in the process of auto-generating the control and monitoring solution for the smart and robotics environments, according to some embodiments of the present disclosure.

FIG. 3, with reference to FIGS. 1 and 2, illustrates an exemplary flow diagram of a method for auto-generating a control and monitoring solution for smart and robotics environments according to an embodiment of the present disclosure. In an embodiment the system 100 comprises one or more data storage devices of the memory 102 operatively coupled to the one or more hardware processors 104 and is configured to store instructions for execution of steps of the method by the one or more processors 104. The steps of the method of the present disclosure will now be explained with reference to the components of the system 100 as depicted in FIG. 1 and the flow diagram. In the embodiments of the present disclosure, the hardware processors 104 when configured the instructions performs one or more methodologies described herein.

In an embodiment, the term 'robotics environments' comprise of the environments that directly or indirectly employ robotics based technologies for executing and/or implementing a plurality of activities (like assisting a customer with a robot computer in a bank without any human intervention). The term 'robotics technologies' comprise all processes necessary to design, build, coordinate and maintain robots and other intelligent machines. Further, the term 'smart environment' means an environment that incorporates advanced automation systems to provide users with sophisticated monitoring and control over the environment's functions. For example, the smart environment may provide its owners with control of lighting, temperature, multimedia, window and door operations and security, as well as the ability to automatically replenish various supplies. In an embodiment, the smart and robotics environments may allow terminals to selectively control any appliances (like a smart energy meter). There may a plurality of appliances, where each appliance may have an assigned unique identifier for security purposes. Further, there may be a plurality of terminals, where each terminal is also assigned a unique identifier. There may also be a database (not shown in FIGS.) of authorization information, with information corresponding to which terminals and when terminals can control appliances. Each appliance, prior to allowing control by one of the terminals, queries the authorization information to verify that the terminal is authorized to control that appliance. Finally, the term 'plurality of devices' comprises all IoT, robotics or cloud technologies based devices that may perform industrial or non-industrial automation of any kind (that is, no human intervention is required) using Internet of things (IoT) or cloud based technologies, for example, a smart energy meter or an environment monitoring sensor.

According to an embodiment of the present disclosure, at step 301, the one or more hardware processors 104 initially capture via the accumulator module 201, a first set of information corresponding to one or more processes, wherein the first set of information comprises a set of domain knowledge corresponding to the one or more processes (example discussed below), and the one or more processes correspond to a plurality of monitoring and control activities executing in the smart and robotics environments. As the smart and robotics environments implement Internet of Things (IoT) and the robotics based technologies for implementing automation of various tasks and processes in such environments, capturing the set of domain knowledge becomes critical.

In an embodiment, the accumulator module 201 captures the first set of information by implementing a domain specific language (DSL). The embodiments of the present disclosure facilitate implementing one or more domain specific languages (for example, Extensible Markup Language (XML) or Latex) or any combinations thereof for capturing the first set of information corresponding to the one or more processes. In an embodiment, the one or more processes comprise the plurality of monitoring and control activities executing in the smart and robotics environments, such as setting up of a room ambience, climate, logistics and a corresponding set of coordination tasks such as setting up of a light, screen, an audio-video connection etc. via devices or robots or artificial intelligence (AI) or by any other means. Thus, the one or more processes generically define the functioning of the smart and robotics environment.

In an example implementation, the first set of information may be captured by the accumulator module 201 by implementing the DSL as below, wherein the first set of information corresponds to the smart and robotics environments, for example, a meeting room, and wherein the one or more processes comprise a meeting activity to be performed in the meeting room using devices integrated into the smart and robotics environments.

```
ActivityDiagram MeetingActivity
{
  activities
  {
    Activity RunEquipmentDiagnostics
    {
    description: "Run a diagnostics of equipment before meeting begins"
    childActivityDiagram : Equipment_Diagnostics
    if (true) nextActivity : SetAmbience
    else nextActivity :EndMeeting
    },
    Activity SetAmbience
    {
      previousActivity : RunEquipmentDiagnostics
      description : "Set Meeting Ambience before it begins"
      childActivityDiagram : SettingAmbienceActivity
      nextActivity : EstablishComms
    },
    Activity EstablishComms
    {
      previousActivity : SetAmbience
      description : "Establish Comms (VCON / VoIP/ Webex)"
      childActivityDiagram : EstablishCommsActivity
      nextActivity : StartMeeting
    },
    Activity StartMeeting
    {
      previousActivity : EstablishComms
      description : "Meeting Session Begins"
      childActivityDiagram : StartMeeting
  requireCapability(
  "Meeting_RunTime_Controller.Capability_Meeting_RunTime_StartMeeting" )
      nextActivity : DisconnectComms
    },
    Activity DisconnectComms
    {
      previousActivity : StartMeeting
      description : "Disconnect Comms (VCON / VoIP/ Webex)"
      childActivityDiagram : DisconnectCommsActivity
      nextActivity : ResetAmbience
    },
    Activity ResetAmbience{
      previousActivity : DisconnectComms
      description : "Turn OFF Lights / Air-condition after Meeting"
      childActivityDiagram : ResetAmbienceActivity
      nextActivity : EndMeeting
    },
    Activity EndMeeting
    {
        previousActivity : DisconnectComms
      description : "Logical End of Meeting"
      requireCapability (
  "Meeting_RunTime_Controller.Capability_Meeting_RunTime_EndMeeting")
    }
  }
}
```

According to an embodiment of the present disclosure, at step 301, the one or more hardware processors 104 further capture using the accumulator module 201, a second set of information on a plurality of devices integrated into the smart and robotics environments, wherein the second set of information comprises data on execution capabilities corresponding to the plurality of devices. The plurality of devices facilitate executing of the one or more processes in the smart and robotics environments. The execution capabilities comprise a set of commands, state transitions and one or more events corresponding to functioning of the plurality of devices. For example, for in a warehouse implementing a robotics technology, a plurality of operation commands like S1, S2, S3 may be conform to the execution capabilities of robots such as a command S1 "stop cycle" issued to stop the operation of a robot and stop the production cycle, a command S2 "prepare to resume" issued to prepare for the resumption of cycle stopped by the command S1 "stop cycle" and a command S3 "diagnose alarm" issued to specify the cause of an alarm. Thus, the plurality of operation commands indicating the one or more events like "stop operation" may comprise of the second set of information.

In an embodiment, the second set of information may be captured by the accumulator module 201 by implementing the DSL. In an example implementation, the second set of information corresponding to the execution capabilities of a device (from amongst the plurality of devices integrated into the smart and robotics environments), for example, a light may be captured using the DSL as below

```
Model Artificial_Lighting_Controller InterfaceDescription Capability_Light_ON
uses Artificial_Lighting_Controller.Artificial_Lighting_System_Id{
commands {
    START [ ],
    END [ ]
}
events {
    START [ ],
    END [ ]
}
operatingStates {
    START [ ],
    END [ ]
    startState : START
    endState : END
}
}
ControlNode Capability_Light_ON{
   Associated Interface Description : Capability_Light_ON
   CommandResponseBlock{
      Command Artificial_Lighting_Controller.Capability_Light_ON.START{
         Transitions {
            currentState
Artificial_Lighting_Controller.Capability_Light_OM.START =>
            nextState
Artificial_Lighting_Controller.Artificial_Lighting_System_Id.OFF(entryAction Action
[fireCommands: Artificial_Lighting_Controller.Artificial_Lighting_System_Id.ON])
         }
      }
Command Artificial_Lighting_Controller.Artificial_Lighting_System_Id.OFF{
Transitions {
currentState Artificial_Lighting_Controller.Artificial_Lighting_System_Id.OFF => nextState
Artificial_Lighting_Controller.Artificial_Lighting_System_Id.ON (
entryAction Action [ fireCommands:
Artificial_Lighting_Controller.Artificial_Lighting_System_Id.ON])
      }
}
Command Artificial_Lighting_Controller.Artificial_Lighting_System_Id.ON{
ResponseBlock{
expectedResponseArtificial_Lighting_Controller.Artificial_Lighting_System_Id.RES_ON{
   ResponseValidation { parameter
Artificial_Lighting_Controller.Artificial_Lighting_System_Id.RES_ON.success [
Possible Values = (true, false)]
         }
      }
   }
   Transitions {
currentState Artificial_Lighting_Controller.Artificial_Lighting_System_Id.OFF => nextState
Artificial_Lighting_Controller.Artificial_Lighting_System_Id.ON (
         entryAction Action [ fireEvents:
Artificial_Lighting_Controller.Artificial_Lighting_System_Id.ON
            fireCommands:
Artificial_Lighting_Controller.Capability_Light_OM.END
         ]
      )
   }
}
Command Artificial_Lighting_Controller.Capability_Light_OM.END {
Transitions { currentState Artificial_Lighting_Controller.Capability_Light_OM.END=>
nextState
```

```
Artificial_Lighting_Controller.Capability_Light_OM.START(
entryAction Action[fireEvents:Artificial_Lighting_Controller.Capability_Light_OM.END])
        }
      }
    }
}}
```

According to an embodiment of the present disclosure, at step 302, the one or more hardware processors 104 auto-generate using the control logic synthesizer module 202, a coordination control logic, based upon the first set of information and the second set of information, wherein the coordination control logic comprises a coordination logic design for implementing a coordination logic between the plurality of devices. In an embodiment, the coordination control logic may be auto-generated by implementing the DSL and the coordination logic comprises logics (in the form of a design or codes) for implementing coordination between the plurality of devices (or between one or more IoT and robotics based devices) integrated in the smart and robotics environments for implementing and executing the one or more processes.

In an embodiment, the coordination control logic may be auto-generated, inter-alia, for implementing an automated control, coordination and monitoring required of the plurality of devices for executing and implementing the one or more processes (or the plurality of monitoring and control activities) and the corresponding technical logics. For example, implementing or executing a meeting in the smart and robotics environments may comprise of establishing communications between the plurality of devices, and the corresponding technical logics for establishing such communications like communicating control data over multiple high-speed communication networks, transmitting a control signal commanding a performance of an automated task by the robot, controlling motion of a respective one of the robotic joints, and a joint coordination-level controller for coordinating motion of the robotic joints in response to the control signal.

In an embodiment, the auto-generated coordination control logic may comprise of a first set of codes as well as the coordination logic design, wherein the first set of codes and the coordination logic design facilitates implementing the automated control, coordination and monitoring for the plurality of devices for performing the plurality of monitoring and control activities. In an embodiment, as discussed above, the coordination control logic and the first set of codes may be auto-generated using the DSL and thus may conform to the DSL based design. Thus, the coordination control logic may be auto-generated by the control logic synthesizer module 202 in the form of either a logic design (that is, the coordination logic design) or in the form of logic codes (that is, the first set of codes).

Figure 4:
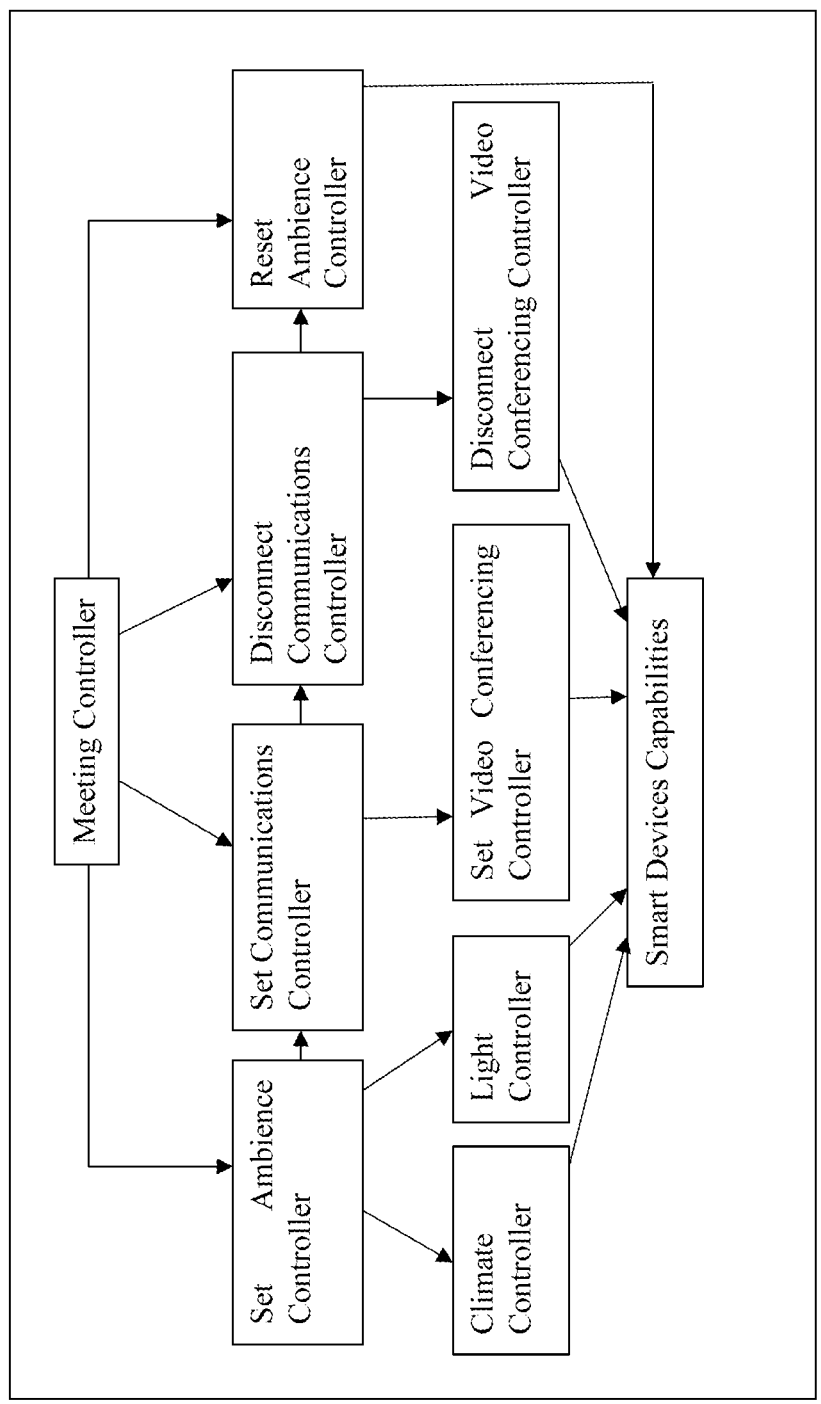
FIG. 4 illustrates a schematic diagram of auto-generated coordination control logic for the process of auto-generating the control and monitoring solutions in the smart and robotics environments, according to some embodiments of the present disclosure.

In an example implementation, suppose the smart and robotic environment comprises of the meeting room, wherein the meeting room comprises the plurality of devices, such as the light and a robot phone. Referring to FIG. 4, the coordination control logic auto-generated in the form of the coordination logic design may be referred. The coordination control logic auto-generated in the form of the first set of codes may be as below:

```
Model MODEL_MeetingActivity InterfaceDescription INTERFACE_MeetingActivity {
    commands {
        SetAmbience_ST [ ],
        SetAmbience_NST [ ],
        EstablishComms_ST [ ],
        EstablishComms_NST [ ],
        StartMeeting_ST [ ],
        StartMeeting_NST [ ],
        DisconnectComms_ST [ ],
        DisconnectComms_NST [ ],
        ResetAmbience_ST [ ],
        ResetAmbience_NST [ ],
        EndMeeting_ST [ ],
        EndMeeting_NST [ ],
        Start [ ],
        End [ ]
    }
    events {
        E_SetAmbience [ ],
        E_EstablishComms [ ],
        E_StartMeeting [ ],
        E_DisconnectComms [ ],
        E_ResetAmbience [ ],
        E_EndMeeting [ ],
        E_START_MeetingActivity [ ],
        E_END_MeetingActivity [ ]
    }
    operatingStates {
        STATE_SetAmbience [ ],
        STATE_EstablishComms [ ],
        STATE_StartMeeting [ ],
        STATE_DisconnectComms [ ],
        STATE_ResetAmbience [ ],
        STATE_EndMeeting [ ],
        STATE_STARTMeetingActivity [ ],
```

```
        STATE_ENDMeetingActivity [ ] startState :
STATE_STARTMeetingActivity
        endState : STATE_ENDMeetingActivity
        }
    SubscribableItemList {
      subscribedEvents :
MODEL_SettingAmbienceActivity.INTERFACE_SettingAmbienceActivity.E_END_SettingAmbienceActivity,
MODEL_ResetAmbienceActivity.INTERFACE_ResetAmbienceActivity.E_START_ResetAmbienceActivity,
Meeting_RunTime_Controller.Capability_Meeting_RunTime_EndMeeting.START,
Meeting_RunTime_Controller.Capability_Meeting_RunTime_EndMeeting.END
        }
    }
ControlNode CONTROL_NODE_MeetingActivity {
  childNodes (
  Meeting_RunTime_Controller.Capability_Meeting_RunTime_StartMeeting,
  Meeting_RunTime_Controller.Capability_Meeting_RunTime_EndMeeting,
  MODEL_SettingAmbienceActivity.CONTROL_NODE_SettingAmbienceActivity,
  MODEL_EstablishCommsActivity.CONTROL_NODE_EstablishCommsActivity,
  MODEL_DisconnectCommsActivity.CONTROL_NODE_DisconnectCommsActivity,
  MODEL_ResetAmbienceActivity.CONTROL_NODE_ResetAmbienceActivity )
        CommandResponseBlock {
        Command MODEL_MeetingActivity.INTERFACE_MeetingActivity.Start {
    Transitions {
    currentState
    MODEL_MeetingActivity.INTERFACE_MeetingActivity.STATE_STARTMeetingActivity
    => nextState
    MODEL_MeetingActivity.INTERFACE_MeetingActivity.STATE_SetAmbience (
    entryAction Action [
    fireCommands:MODEL_MeetingActivity.INTERFACE_MeetingActivity.SetAmbience_ST ] )
            }
        }
        Command
    MODEL_MeetingActivity.INTERFACE_MeetingActivity.ResetAmbience_ST
    {Transitions {currentState
        MODEL_MeetingActivity.INTERFACE_MeetingActivity.STATE_ResetAmbience
    (exitAction Action [ fireCommands :
    MODEL_ResetAmbienceActivity.INTERFACE_ResetAmbienceActivity.Start ] )
    => nextState
    MODEL_MeetingActivity.INTERFACE_MeetingActivity.STATE_ResetAmbience }
        }
    Command
    MODEL_MeetingActivity.INTERFACE_MeetingActivity.ResetAmbience_NST
    {Transitions { currentState
    MODEL_MeetingActivity.INTERFACE_MeetingActivity.STATE_ResetAmbience =>
    nextState MODEL_MeetingActivity.INTERFACE_MeetingActivity.STATE_EndMeetin
    ( entryAction Action [ fireCommands :
    MODEL_MeetingActivity.INTERFACE_MeetingActivity.EndMeeting_ST ] )
            }
        }
    Command MODEL_MeetingActivity.INTERFACE_MeetingActivity.EndMeeting_ST {
        Transitions {
    currentStateMODEL_MeetingActivity.INTERFACE_MeetingActivity.STATE_EndMeeting
(exitAction Action [ fireCommands :
    Meeting_RunTime_Controller.Capability_Meeting_RunTime_EndMeeting.START ]
)=> nextState
    MODEL_MeetingActivity.INTERFACE_MeetingActivity.STATE_EndMeeting
            }
        }
    Command MODEL_MeetingActivity.INTERFACE_MeetingActivity.EndMeeting_NST
    {Transitions {currentState
    MODEL_MeetingActivity.INTERFACE_MeetingActivity.STATE_EndMeeting =>
    nextState
    MODEL_MeetingActivity.INTERFACE_MeetingActivity.STATE_ENDMeetingActivity (
            entryAction Action [ fireCommands :
        MODEL_MeetingActivity.INTERFACE_MeetingActivity.End fireEvents :
        INTERFACE_MeetingActivity.E_END_MeetingActivity ] )
            }
        }
        Command MODEL_MeetingActivity.INTERFACE_MeetingActivity.End {
            Transitions {
                currentState
        MODEL_MeetingActivity.INTERFACE_MeetingActivity.STATE_ENDMeetingActivity
            => nextState
        MODEL_MeetingActivity.INTERFACE_MeetingActivity.STATE_STARTMeetingActivity
            }
        }
    }
```

```
EventBlock {
  Event
MODEL_SettingAmbienceActivity.INTERFACE_SettingAmbienceActivity.E_END_SettingAmbienceActivity
  {
    EventHandling {
      Action [ fireCommands :
MODEL_MeetingActivity.INTERFACE_MeetingActivity.SetAmbience_NST ]
    }
  }
  Event
MODEL_SettingAmbienceActivity.INTERFACE_SettingAmbienceActivity.E_START_SettingAmbienceActivity
  {
    EventHandling {
      Action [ fireCommands :
MODEL_MeetingActivity.INTERFACE_MeetingActivity.SetAmbience_NST ]
    }
  }
  Event
MODEL_ResetAmbienceActivity.INTERFACE_ResetAmbienceActivity.E_END_ResetAmbienceActivity
  {
    EventHandling {
      Action [ fireCommands :
MODEL_MeetingActivity.INTERFACE_MeetingActivity.ResetAmbience_NST ]
    }
  }
  Event
MODEL_ResetAmbienceActivity.INTERFACE_ResetAmbienceActivity.E_START_ResetAmbienceActivity
  {
    EventHandling {
      Action [ fireCommands :
MODEL_MeetingActivity.INTERFACE_MeetingActivity.ResetAmbience_NST ]
    }
  }
  Event
Meeting_RunTime_Controller.Capability_Meeting_RunTime_EndMeeting.START
  {
    EventHandling {
      Action [ fireCommands :
MODEL_MeetingActivity.INTERFACE_MeetingActivity.EndMeeting_NST ]
    }
  }
  Event
Meeting_RunTime_Controller.Capability_Meeting_RunTime_EndMeeting.END {
    EventHandling {
      Action [ fireCommands :
MODEL_MeetingActivity.INTERFACE_MeetingActivity.EndMeeting_NST ]
    }
  }
 }
 Associated Interface Description : INTERFACE_MeetingActivity
}
```

According to an embodiment of the present disclosure, at step 303, the one or more hardware processors 104 auto-generate via the implementation module 203, the control and monitoring solution corresponding to the smart and robotics environments based upon the coordination control logic. In an embodiment, for auto-generating the control and monitoring solution, the one or more hardware processors 104 initially capture technical information from the existing IoT or robotics frameworks, for example, Zetta™. Based upon the technical information or knowledge captured, the one or more hardware processors 104 generate one or more code generator templates, wherein the one or more code generator templates comprise of a set of mapping rules to auto-generate the control and monitoring solution based upon the coordination control logic. Thus, the set of mapping rules automatically translate the coordination control logic into the control and monitoring solution.

In an example implementation, the one or more code generator templates comprising of the set of mapping rules to auto-generate the control and monitoring solution (based upon the coordination control logic) may be as below:

```
package com.zetta.codegenerator.handlers
class ZettaGeneratorForCapability {
  var interfaceDesc = null as InterfaceDescription
    def getStringToBePlacedInFile_CAPABILITY(
     Model model) {
        var childNodes = GeneratorUtils.getChildNodes(model)
        interfaceDesc = model.systems.get(0) as InterfaceDescription
        var allCommandBlocks = GeneratorUtils.getAllCommandBlocks(model)
        var allEventBlocks = GeneratorUtils.getAllEventBlocks(model)
        var subscribedEvents = new BasicEList<Event>
```

```
                if(interfaceDesc.subscribedItems!==null &&
interfaceDesc.subscribedItems.subscribedEvents!==null){
        subscribedEvents.addAll(interfaceDesc.subscribedItems.subscribedEvents)
                }
                var allCommands = (model.systems.get(0) as
InterfaceDescription).commands.commands
                var allStates = (model.systems.get(0) as
InterfaceDescription).operatingStates.operatingStates
                '''
                        var Device = require('zetta-device');
                        var util = require('util');
                        «IF childNodes!==null»
                        «FOR childNode : childNodes»
                                var «childNode.name»_global;
                        «ENDFOR»
                        «ENDIF»
                        «IF interfaceDesc.uses !== null»
                        «FOR interfaceD : interfaceDesc.uses»
                                var «interfaceD.name»_global;
                        «ENDFOR»
                        «ENDIF»
                        var sensor;
                        var selfObject;
                        var «interfaceDesc.name»_Capability = module.exports =
function(name,
                        «IF childNodes!==null»
                        «FOR childNode : childNodes»
                        «childNode.name»,
                        «ENDFOR»
                        «ENDIF»
                        «IF interfaceDesc.uses !== null»
                        «FOR interfaceD : interfaceDesc.uses»
                        «interfaceD.name»,
                        «ENDFOR.»«ENDIF»
                        local_sensor){
                                Device.call(this);
                                this.assignedName = name;
                                selfObject = this;
                                «IF childNodes!==null»
                                «FOR childNode : childNodes»
                                «childNode.name»_global=«childNode.name»;
                                «ENDFOR»
                                «ENDIF»
                                «IF interfaceDesc.uses !== null»
                                «FOR interfaceD : interfaceDesc.uses»
                                «interfaceD.name»_global=«interfaceD.name»;
                                «ENDFOR»
                                «ENDIF»
                                sensor = local_sensor;
                }
                var commands = [«FOR command :
GeneratorUtils.getCmdForDevice(model)» '«command.name»'
«IF(!command.equals(GeneratorUtils.getCmdForDevice(model).last))»,«ENDIF»
«ENDFOR»];
util.inherits(«interfaceDesc.name»_Capability, Device);
«interfaceDesc.name»_Capability.prototype.init = function(config) {
config
                        .type('CAPABILITY_«interfaceDesc.name»')
                        .state('«interfaceDesc.operatingStates.startState.name»')
                        .name(this.assignedName);
config
                «createMappingsForAllowedState(allStates,allCommandBlocks)»
                «createMappingsForCommandsWithFunctions(allCommands)»
«createSubscriptionForEventsAndHandlers(allEventBlocks,subscribedEvents)»
                };
        «createHandlerFunctionForEvents(allEventBlocks)»
        «createBehaviourOfCommandAsPerControlNode(allCommands,allCommandBlocks,
        model)»
                }
        def createHandlerFunctionForEvents(BasicEList<EventBlock> list) {
                var string =""
                for(eventBlock : list){
                        string = string +'''
                        function
handleEvent_«(EcoreUtil2.getContainerOfType(eventBlock.event,
Model).systems.get(0) as
InterfaceDescription).name»_«eventBlock.event.name.toFirstUpper»(topic, data){
var self = this;
«IF eventBlock.eventHandling!==null &&
```

```
eventBlock.eventHandling.triggerAction!==null»«IF
eventBlock.eventHandling.triggerAction.command!==null»
«FOR com: eventBlock.eventHandling.triggerAction.command»
                «IF
EcoreUtil2.getContainerOfType(com,InterfaceDescription).equals(interfaceDesc)»
                        selfObject.call('«com.name»');
                        «ELSE»
                        «(EcoreUtil2.getContainerOfType(com,
Model).systems.get(1) as ControlNode).name»_global.call('«com.name»');
                        «ENDIF» «ENDFOR»«ENDIF»«ENDIF»
                };
                '''
        }
        return string
    }
    def createSubscriptionForEventsAndHandlers(BasicEList<EventBlock>
list,EList<Event> subscribedEvents) {
        var string = ''''''
        for(eventBlock : list){
                if(subscribedEvents.contains(eventBlock.event))
                {
        string = string +'''
selfObject._pubsub.subscribe('«(EcoreUtil2.getContainerOfType(eventBlock.event,
Model).systems.get(0) as
InterfaceDescription).name»/Event/«eventBlock.event.name»',handleEvent_«(EcoreUtil2.
getContainerOfType(eventBlock.event, Model).systems.get(0) as
InterfaceDescription).name»_«eventBlock.event.name.toFirstUpper»);
                '''
                }
        }
        return string
    }
    def getControlNodeNameElseInterfaceDescriptionName(Command command)
{
        var sys = EcoreUtil2.getContainerOfType(command,Model).systems
        if(sys.size>1){
                return (sys.get(1) as ControlNode).name
        }else{
                return (sys.get(0) as InterfaceDescription).name
        }
    }
    def createMappingsForCommandsWithFunctions(EList<Command>
commands) {
        var string = ''''''
        for(command : commands){
        string = string +'''
.map('«command.name»', this.«command.name»)
'''
        }
        return string
    }
    def createMappingsForAllowedState(EList<OperatingState>
states,EList<CommandResponseBlock> allCommandBlocks){
        var string
        for(state : states){
                string = string+ '''
                .when('«state.name»', (allow:
[«getAllowedCommandForAState(state,allCommandBlocks)»]})
                '''
        }
        return string
    }
    def getAllowedCommandForAState(OperatingState
state,EList<CommandResponseBlock> commandRespList){
        var allowedCommands = new HashSet<String>( );
        for(commandRespBlock:commandRespList){
                if(commandRespBlock.transition!==null &&
commandRespBlock.transition.transitions!==null){
                        for(trans : commandRespBlock.transition.transitions){
if(trans.currentState!==null && trans.currentState.equals(state)){
allowedCommands.add('''''+commandRespBlock.command.name+''''')
                                if(trans.exitAction!==null &&
trans.exitAction.command!==null){
        for (com : trans.exitAction.command) {
                allowedCommands.add('''''+ com.name +''''')}
                        }
                                }
if(trans.nextState!==null && trans.nextState.equals(state)){
allowedCommands.add('''''+commandRespBlock.command.name+''''')
```

```
        if (trans.entryAction !== null && trans.entryAction.command !== null) {
            for (com : trans.entryAction.command) {`
        allowedCommands.add(""" + com.name +""")
                                                }
        } }}}}
                    return StringUtils.join(allowedCommands,',')
        }}
```

In the above example implementation corresponding to the one or more code generator templates, referring to below embodiment (from the one or more code generator templates), it may be noted that for activities 'wake up VCON' and 'connect to VCON session' (from amongst the plurality of monitoring and control activities), the mapping (that is, a capability mapping) may be performed by the one or more hardware processors 104. The capability mapping comprises the mapping of the activities 'wake up VCON' and 'connect to VCON session' with a device VCON_System_Controller. The highlighted part (in bold) represents the mapping or provides for the set of mapping rules.

```
        ActivityDiagram SetUpVCONSystem
{
activities
{
Activity WakeUpVCON
{
description : "Waking up the VCON system"
requireCapability
("VCON_System_Controller.Capability_VCON_Standby")
nextActivity : ConnectToVCONSession
},
Activity ConnectToVCONSession
{
previousActivity : WakeUpVCON
description : "Connect VCON Session"
requireCapability
("VCON_System_Controller.Capability_Connect_VCON_Meeting")
}}}
```

Figure 5:
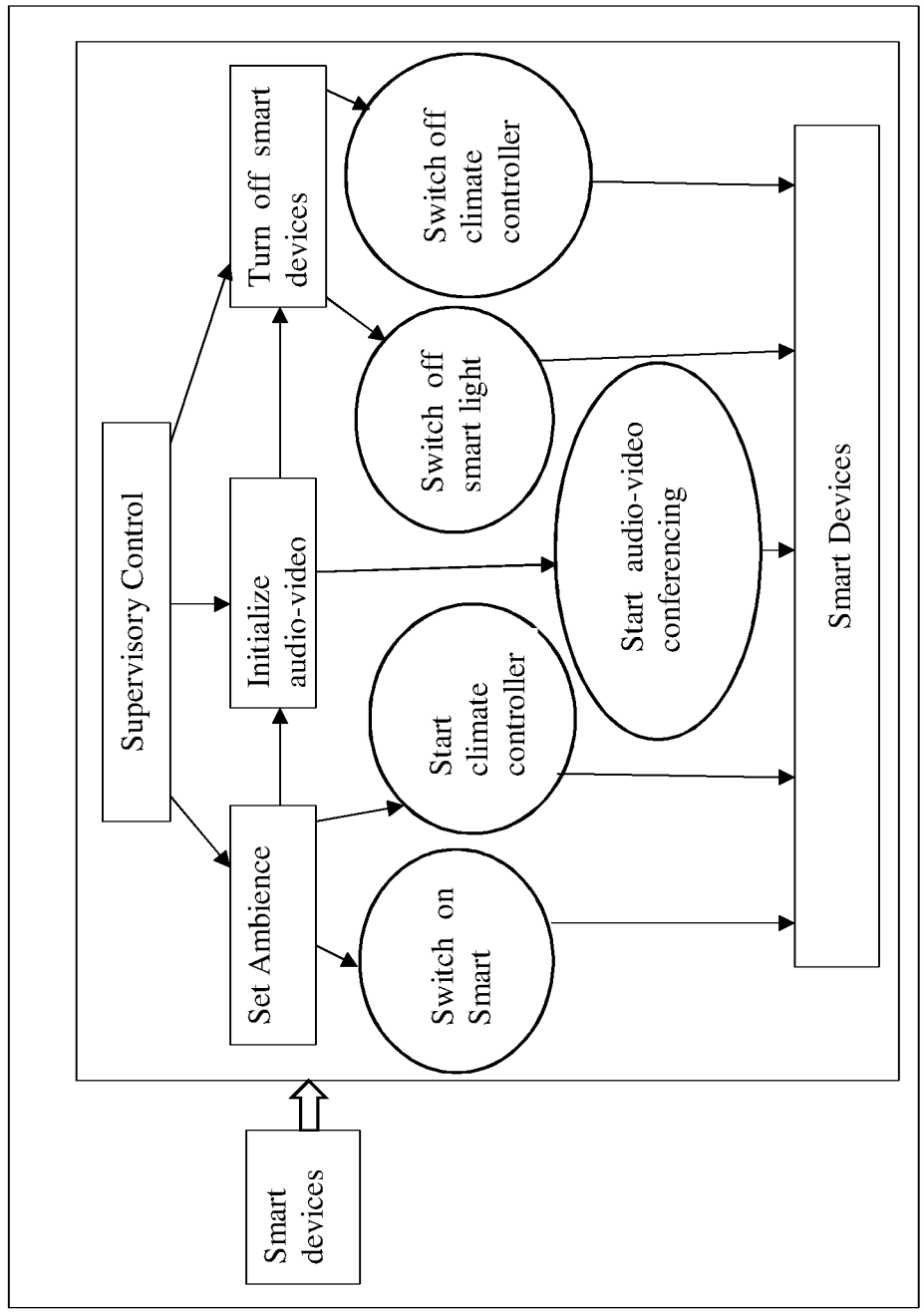
FIG. 5 illustrates a schematic diagram of the control and monitoring solution auto-generated for the smart and robotics environments, according to some embodiments of the present disclosure.

In an embodiment, referring to FIG. 5, the control and monitoring solution for the meeting room auto-generated based upon the coordination control logic may be referred, wherein the control and monitoring solution comprises of a design model corresponding to the meeting room.

In an embodiment, the step of auto-generating the control and monitoring solution comprises auto-generating, based upon the coordination control logic, a second set of codes to translate the coordination control logic into the control and monitoring solution. In an embodiment, the second set of codes represent the control and monitoring solution for the smart and robotics environments (in the form of auto-generated codes) and thus may be referred to as the control and monitoring solution auto-generated by translating the coordination control logic into the auto-generated second set of codes (using the one or more code generator templates as discussed above).

In an embodiment, the second the set of codes may be auto-generated using the one or more code generator templates (from the existing IoT or robotics frameworks). Thus, the present disclosure provides for the auto-generated control and monitoring solution in the form of the design model as well as in the form of the auto-generated second set of codes. The control and monitoring solution (auto-generated based upon the coordination control logic) represented in the form of the auto-generated second set of codes may be as below:

```
                var Device = require('zetta-device');
                var util = require('util');
                Capability_Meeting_RunTime_StartMeeting_global=Capability_Meeting_RunTime_StartMeeting;
                Capability_Meeting_RunTime_EndMeeting_global=Capability_Meeting_RunTime_EndMeeting;
                CONTROL_NODE_SettingAmbienceActivity_global=CONTROL_NODE_SettingAmbienceActivity;
                CONTROL_NODE_EstablishCommsActivity_global=CONTROL_NODE_EstablishCommsActivity;
                CONTROL_NODE_DisconnectCommsActivity_global=CONTROL_NODE_DisconnectCommsActivity;
                CONTROL_NODE_ResetAmbienceActivity_global=CONTROL_NODE_ResetAmbienceActivity;
                sensor = local_sensor;
                }
                var commands = [ 'SetAmbience_ST' , 'SetAmbience_NST' , 'EstablishComms_ST' ,
        'EstablishComms_NST' , 'StartMeeting_ST' , 'StartMeeting_NST' , 'DisconnectComms_ST' ,
        'DisconnectComms_NST'  ,    'ResetAmbience_ST'  ,    'ResetAmbience_NST'   ,
        'EndMeeting_ST' , 'EndMeeting_NST' , 'Start' , 'End' ];
                    util.inherits(INTERFACE_MeetingActivity_Capability, Device);
                    INTERFACE_MeetingActivity_Capability.prototype.init = function(config) {
                    config
                    .type('CAPABILITY_INTERFACE_MeetingActivity')
                    .state('STATE_STARTMeetingActivity')
                    .name(this.assignedName);
                    config
                    .when('STATE_SetAmbience', {allow: ['SetAmbience_ST','Start','SetAmbience_NST']})
                    .when('STATE_EstablishComms',                                        {allow:
        ['EstablishComms_NST','Start','SetAmbience_NST','EstablishComms_ST']})
                    .when('STATE_StartMeeting',                                          {allow:
        ['EstablishComms_NST','StartMeeting_ST','StartMeeting_NST','START']})
                    .when('STATE_DisconnectComms',                                       {allow:
        ['DisconnectComms_NST','Start','StartMeeting_NST','DisconnectComms_ST']})
                    .when('STATE_ResetAmbience',                                         {allow:
        ['ResetAmbience_NST','DisconnectComms_NST','ResetAmbience_ST','Start']})
                    .when('STATE_EndMeeting',                                            {allow:
```

```
['ResetAmbience_NST','EndMeeting_ST','EndMeeting_NST','START']})
        .when('STATE_STARTMeetingActivity', {allow: ['End','Start']})
        .when('STATE_ENDMeetingActivity', {allow: ['End','EndMeeting_NST']})
        .map('SetAmbience_ST', this.SetAmbience_ST)
        .map('SetAmbience_NST', this.SetAmbience_NST)
        .map('EstablishComms_ST', this.EstablishComms_ST)
        .map('EstablishComms_NST', this.EstablishComms_NST)
        .map('StartMeeting_ST', this.StartMeeting_ST)
        .map('StartMeeting_NST', this.StartMeeting_NST)
        .map('DisconnectComms_ST', this.DisconnectComms_ST)
        .map('DisconnectComms_NST', this.DisconnectComms_NST)
        .map('ResetAmbience_ST', this.ResetAmbience_ST)
        .map('ResetAmbience_NST', this.ResetAmbience_NST)
        .map('EndMeeting_ST', this.EndMeeting_ST)
        .map('EndMeeting_NST', this.EndMeeting_NST)
        .map('Start', this.Start)
        .map('End', this.End)
        function
handleEvent_INTERFACE_SettingAmbienceActivity_E_END_SettingAmbienceActivity(topic,
data){
        var self = this;
        selfObject.call('SetAmbience_NST');
        };
        function
handleEvent_INTERFACE_SettingAmbienceActivity_E_START_SettingAmbienceActivity(topic,
data){
        var self = this;
        selfObject.call('SetAmbience_NST');
        };
        INTERFACE_MeetingActivity_Capability.prototype.StartMeeting_ST     =
function(callBack) {
        var self = this;
        console.log('COMMAND CALLED ::::::: StartMeeting_ST FROM');
        if(this.state==='STATE_StartMeeting')
        {
        // Exit Actions
        Capability_Meeting_RunTime_StartMeeting_global.call('START',function( ){
        // State Transition
        console.log('BEFORE TRANSITION IN <StartMeeting_ST> STATE IS :::::'+self.state);
        self.state = 'STATE_StartMeeting'
        console.log('AFTER TRANSITION IN <StartMeeting_ST> STATE IS :::::'+self.state);
        // Entry Actions
        });
        }
        //callBack( );
        }
        INTERFACE_MeetingActivity_Capability.prototype.ResetAmbience_ST     =
function(callBack) {
        var self = this;
        console.log('COMMAND CALLED ::::::: ResetAmbience_ST FROM');
        if(this.state==='STATE_ResetAmbience')
        {
        // Exit Actions
        CONTROL_NODE_ResetAmbienceActivity_global.call('Start',function( ){
        // State Transition
        console.log('BEFORE   TRANSITION   IN   <ResetAmbience_ST>   STATE   IS
:::::'+self.state);
        self.state = 'STATE_ResetAmbience'
        console.log('AFTER   TRANSITION   IN   <ResetAmbience_ST>   STATE   IS
:::::'+self.state);
        // Entry Actions
        });
        }
        //callBack( );
        }
        INTERFACE_MeetingActivity_Capability.prototype.ResetAmbience_NST     =
function(callBack) {
        var self = this;
        console.log('COMMAND CALLED ::::::: ResetAmbience_NST FROM');
        if(this.state==='STATE_ResetAmbience')
        {
        // Exit Actions
        // State Transition
        console.log('BEFORE   TRANSITION   IN   <ResetAmbience_NST>   STATE   IS
:::::'+self.state);
        self.state = 'STATE_EndMeeting'
        console.log('AFTER   TRANSITION   IN   <ResetAmbience_NST>   STATE   IS
```

```
:::::'+self.state);
    // Entry Actions
    this.call('EndMeeting_ST')
    }
    //callBack( );
    }
    INTERFACE_MeetingActivity_Capability.prototype.EndMeeting_ST       =
function(callBack) {
    var self = this;
    console.log('COMMAND CALLED :::::::: EndMeeting_ST FROM');
    if(this.state==='STATE_EndMeeting')
    {
    // Exit Actions
    Capability_Meeting_RunTime_EndMeeting_global.call('START',function( ){
    // State Transition
    console.log('BEFORE TRANSITION IN <EndMeeting_ST> STATE IS :::::'+self.state);
    self.state = 'STATE_EndMeeting'
    console.log('AFTER TRANSITION IN <EndMeeting_ST> STATE IS :::::'+self.state);
    // Entry Actions
    });
    }
    //callBack( );
    }
    INTERFACE_MeetingActivity_Capability.prototype.End = function(callBack) {
    var self = this;
    console.log('COMMAND CALLED :::::::: End FROM');
    if(this.state==='STATE_ENDMeetingActivity')
    {
    // Exit Actions
    // State Transition
    console.log('BEFORE TRANSITION IN <End> STATE IS :::::'+self.state);
    self.state = 'STATE_STARTMeetingActivity'
    console.log('AFTER TRANSITION IN <End> STATE IS :::::'+self.state);
    // Entry Actions
    }
    //callBack( );
    }
```

In an embodiment, the auto-generated control and monitoring solution comprises a hierarchy of the plurality of control and monitoring activities and the corresponding coordination control logic for defining one or more execution logics of the plurality of devices. Further, the plurality of control and monitoring activities comprises one or more sub-activities representing mapping of the plurality of control and monitoring activities with the plurality of devices. In an embodiment, the one or more execution logics comprise logics (in the form of a design or codes or any combination thereof) required for executing the plurality of monitoring and control activities in the smart and robotics environments by implementing the auto-generated control and monitoring solution.

In an example implementation, suppose the auto-generated control and monitoring solution is implemented to start a meeting in the meeting room. Referring to an embodiment from the second set of codes, it may be noted that the auto-generated control and monitoring solution comprises of the hierarchy of the plurality of control and monitoring activities (required for starting of the meeting), for example, setting ambience initially followed by establishing communications connectivity, disconnecting communications connectivity and finally resetting the ambience once the meeting is concluded. The proposed disclosure allows the hierarchy to be auto-generated (based upon the coordination control logic) for executing the plurality of control and monitoring activities. An example of the auto-generated hierarchy of the plurality of control and monitoring activities is shown below.

As discussed above, the plurality of control and monitoring activities comprises one or more sub-activities representing mapping of the plurality of control and monitoring activities with the plurality of devices, wherein the mapping is performed based upon the coordination control logic. For example, referring to the below examples, it may be noted that the activity resetting ambience of the meeting room may comprise of the one or more sub-activities like switching off the lights and air-condition etc. and based upon the coordination control logic, the activity resetting ambience may be mapped to the light and the air-conditioner etc. (from amongst the plurality of devices integrated into the smart and robotics environments) for resetting ambience.

Example of the Hierarchy the Plurality of Control and Monitoring Activities (from the Second Set of Codes or the Auto-Generated Control and Monitoring Solution) —
    Capability_Meeting_RunTime_StartMeeting_global=
        Capability_Meeting_RunTime_StartMeeting;
    Capability_Meeting_RunTime_EndMeeting_global=
        Capability_Meeting_RunTime_EndMeeting;
    CONTROL_NODE_SettingAmbienceActivity_global=
        CONTROL_NODE_SettingAmbienceActivity;
    CONTROL_NODE_EstablishCommsActivity_global=
        CONTROL_NODE_EstablishCommsActivity;
    CONTROL_NODE_DisconnectCommsActivity_global=CONTROL_NODE_DisconnectCommsActivity;
    CONTROL_NODE_ResetAmbienceActivity_global=
        CONTROL_NODE_ResetAmbienceActivity;
Example of the One or More Sub-Activities—

Activity ResetAmbience{
        previousActivity : DisconnectComms
        description : "Turn OFF Lights / Air-condition after Meeting"

According to an embodiment of the present disclosure, technical advantages of the present disclosure may now be considered in detail. The proposed disclosure facilitates automation of multiple tasks to be implemented for performing the set of activities in the smart and robotics environments. For example, the proposed disclosure provides for an auto-generation of the coordination control logic for implementing coordination between the plurality of devices and/or robotics devices. The traditional systems and methods require the programming logics to be written by the programmers for implementing the coordination between the plurality of devices and/or robotics devices. This requires lot of manual efforts and time to capture domain knowledge and information on the devices (integrated into the smart and robotics environments) and then write the programming logics for implementing the set of activities in the smart and robotics environments. Further, the proposed disclosure provides for capturing of the various technologies or knowledge from the IoT and robotics areas using the DSL and facilitates implementation of the prior knowledge in new areas of the smart and robotics environments.

Still further, the proposed disclosure provides for a flexibility to auto-generate the coordination control logic using any third-party frameworks, for example, Zetta™. This greatly reduces the manual labor and ensures traceability and correctness of generated solution. Also, the proposed disclosure may be manually enhanced to implement other specific logic as required. Finally, the proposed disclosure provides for the auto-generation of the control and monitoring solution in the form of a software codes as well as in the form of the design logic. This provides a flexibility of viewing the hierarchy of the plurality control and monitoring activities to be executed along with the corresponding plurality of devices and the coordination control logic required for their execution. Based upon the requirements, the hierarchy, the coordination control logic etc. may be re-designed while implementing a new solution for the smart and robotics environments.

In an embodiment, the memory 102 can be configured to store any data that is associated with auto-generating the control and monitoring solution for the smart and robotics environments. In an embodiment, information or data pertaining to the first set of information and the second set of information, the auto-generated coordination control logic and the first set of codes and the second set of codes auto-generated etc. are stored in the memory 102. Further, all information (inputs, outputs and so on) pertaining to auto-generating the control and monitoring solution for the smart and robotics environments may also be stored in the database, as history data, for reference purpose.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, BLU-RAYs, flash drives, disks, and any other known physical storage media.

It is intended that the disclosure and examples be considered as exemplary only, with a true scope and spirit of disclosed embodiments being indicated by the following claims.

What is claimed is:

1. A method of auto-generating a control and monitoring solution for smart and robotics environments, the method comprising a processor implemented steps of:
performing, a plurality of steps, wherein the plurality of steps comprises:
(i) capturing, by an accumulator module, a first set of information corresponding to one or more processes, wherein the first set of information comprises a set of domain knowledge corresponding to the one or more processes, and wherein the one or more processes correspond to a plurality of monitoring and control activities executing in the smart and robotics environments (301);
(ii) capturing, by the accumulator module, a second set of information on a plurality of devices integrated into the smart and robotics environments, wherein the second set of information comprises data on execution capabilities corresponding to the plurality of devices (301);
(iii) auto-generating, based upon the first set of information and the second set of information, a coordination control logic, by a control logic synthesizer module, wherein the coordination control logic comprises a coordination logic design for implementing a coordination logic between the plurality of devices (302); and
(iv) auto-generating, by an implementation module, the control and monitoring solution corresponding to the smart and robotics environments, based upon the coordination control logic, wherein the auto-generated control and monitoring solution comprises a hierarchy of the plurality of control and monitoring activities and the coordination control logic for defining one or more execution logics of the plurality of devices, wherein the plurality of control and monitoring activities comprise one or more sub-activities representing mapping of the plurality of control and monitoring activities with the plurality of devices, and wherein the mapping is performed based upon the auto-generated coordination control logic (303).

2. The method of claim 1, wherein the step of auto-generating the coordination control logic comprises auto-generating, based upon the first set of information and the second set of information, a first set of codes, by the control logic synthesizer module 202, for implementing the coordination logic between the plurality of devices.

3. The method of claim 1, wherein the step of auto-generating the control and monitoring solution comprises auto-generating, based upon the coordination control logic, a second set of codes to translate the coordination control logic into the control and monitoring solution.

4. A system (100) for auto-generating a control and monitoring solution for smart and robotics environments, the system (100) comprising:
a memory (102) storing instructions;
one or more communication interfaces (106); and
one or more hardware processors (104) coupled to the memory (102) via the one or more communication interfaces (106), wherein the one or more hardware processors (104) are configured by the instructions to: perform, a plurality of steps, wherein the plurality of steps comprises:
(i) capture, by an accumulator module (201), a first set of information corresponding to one or more processes, wherein the first set of information comprises a set of domain knowledge corresponding to the one or more processes, and wherein the one or more processes correspond to a plurality of monitoring and control activities executing in the smart and robotics environments;
(ii) capture, by the accumulator module (201), a second set of information on a plurality of devices integrated into the smart and robotics environments, wherein the second set of information comprises data on execution capabilities corresponding to the plurality of devices;
(iii) auto-generate, based upon the first set of information and the second set of information, a coordination control logic, by a control logic synthesizer module (202), wherein the coordination control logic comprises a coordination logic design for implementing a coordination logic between the plurality of devices; and
(iv) auto-generate, by an implementation module (203), the control and monitoring solution corresponding to the smart and robotics environments, based upon the coordination control logic, wherein the auto-generated control and monitoring solution comprises a hierarchy of the plurality of control and monitoring activities and the coordination control logic for defining one or more execution logics of the plurality of devices, wherein the plurality of control and monitoring activities comprise one or more sub-activities representing mapping of the plurality of control and monitoring activities with the plurality of devices, and wherein the mapping is performed based upon the auto-generated coordination control logic.

5. The system (100) of claim 4, wherein the one or more hardware processors (104) are configured to auto-generate the coordination control logic by auto-generating, based upon the first set of information and the second set of information, a first set of codes, by the control logic synthesizer module (202), for implementing the coordination logic between the plurality of devices.

6. The system (100) of claim 4, wherein the one or more hardware processors (104) are configured to auto-generate the control and monitoring solution by auto-generating, based upon the coordination control logic, a second set of codes to translate the coordination control logic into the control and monitoring solution.

7. One or more non-transitory machine readable information storage mediums comprising one or more instructions which when executed by one or more hardware processors causes the one or more hardware processors to perform a method for auto-generating a control and monitoring solution for smart and robotics environments, said method comprising:
performing, a plurality of steps, wherein the plurality of steps comprises:
(i) capturing, by an accumulator module, a first set of information corresponding to one or more processes, wherein the first set of information comprises a set of domain knowledge corresponding to the one or more processes, and wherein the one or more processes correspond to a plurality of monitoring and control activities executing in the smart and robotics environments (301);

(ii) capturing, by the accumulator module, a second set of information on a plurality of devices integrated into the smart and robotics environments, wherein the second set of information comprises data on execution capabilities corresponding to the plurality of devices (301);

(iii) auto-generating, based upon the first set of information and the second set of information, a coordination control logic, by a control logic synthesizer module, wherein the coordination control logic comprises a coordination logic design for implementing a coordination logic between the plurality of devices (302); and (iv) auto-generating, by an implementation module, the control and monitoring solution corresponding to the smart and robotics environments, based upon the coordination control logic, wherein the auto-generated control and monitoring solution comprises a hierarchy of the plurality of control and monitoring activities and the coordination control logic for defining one or more execution logics of the plurality of devices, wherein the plurality of control and monitoring activities comprise one or more sub-activities representing mapping of the plurality of control and monitoring activities with the plurality of devices, and wherein the mapping is performed based upon the auto-generated coordination control logic (303).

8. The one or more non-transitory machine readable information storage mediums of claim 7, wherein the step of auto-generating the coordination control logic comprises auto-generating, based upon the first set of information and the second set of information, a first set of codes, by the control logic synthesizer module 202, for implementing the coordination logic between the plurality of devices.

9. The one or more non-transitory machine readable information storage mediums of claim 7, wherein the step of auto-generating the control and monitoring solution comprises auto-generating, based upon the coordination control logic, a second set of codes to translate the coordination control logic into the control and monitoring solution.

* * * * *